(12) United States Patent
Jenree et al.

(10) Patent No.: US 11,479,675 B2
(45) Date of Patent: Oct. 25, 2022

(54) COATED SOLAR REFLECTIVE GRANULES AND METHODS OF MANUFACTURING THE SAME

(71) Applicant: U.S. Silica Company, Frederick, MD (US)

(72) Inventors: Rhonda Jenree, Berkeley Springs, WV (US); Dale Addison Grove, Hagerstown, MD (US)

(73) Assignee: U.S. Silica Company, Katy, TX (US)

( * ) Notice: Subject to any disclaimer, the term of this patent is extended or adjusted under 35 U.S.C. 154(b) by 139 days.

(21) Appl. No.: 16/370,303

(22) Filed: Mar. 29, 2019

(65) Prior Publication Data

US 2020/0308413 A1    Oct. 1, 2020

(51) Int. Cl.

| | |
|---|---|
| *B32B 5/16* | (2006.01) |
| *B05D 7/00* | (2006.01) |
| *C09C 3/10* | (2006.01) |
| *C09C 3/12* | (2006.01) |
| *C09C 3/06* | (2006.01) |
| *F26B 3/084* | (2006.01) |
| *F26B 1/00* | (2006.01) |
| *F26B 25/00* | (2006.01) |
| *C09C 1/42* | (2006.01) |
| *E04D 7/00* | (2006.01) |

(52) U.S. Cl.
CPC ............. *C09C 3/10* (2013.01); *C09C 1/42* (2013.01); *C09C 3/063* (2013.01); *C09C 3/12* (2013.01); *F26B 1/00* (2013.01); *F26B 3/084* (2013.01); *F26B 25/007* (2013.01); *E04D 7/005* (2013.01)

(58) Field of Classification Search
CPC .... C09K 3/22; C01P 2006/20; C01P 2006/60; C01P 2006/90; Y10T 428/2991; Y10T 428/24388; C04B 14/10; C04B 20/1051; C04B 20/1055; C04B 20/1088
USPC .................................................. 428/403–406
See application file for complete search history.

(56) References Cited

U.S. PATENT DOCUMENTS

| | | |
|---|---|---|
| 5,090,813 A | 2/1992 | McFarland et al. |
| 5,196,473 A | 3/1993 | Valenta et al. |
| 2015/0184391 A1* | 7/2015 | Standeford ............ B05D 1/30 427/174 |
| 2016/0107929 A1 | 4/2016 | Kalkanoglu et al. |
| 2017/0027165 A1* | 2/2017 | Moudgil ................ A01N 25/30 |
| 2017/0174575 A1 | 6/2017 | Li et al. |
| 2018/0163057 A1 | 6/2018 | Jenree et al. |

(Continued)

OTHER PUBLICATIONS

Wacker Silicones, Silres® BS 3003—Masonry Water Repellents, Technical Data Sheet, 2011 (Year: 2011).*

*Primary Examiner* — Hoa (Holly) Le
(74) *Attorney, Agent, or Firm* — The Webb Law Firm

(57) ABSTRACT

A reflective particulate material comprises a particulate substrate, and a coating on the particulate substrate. The coated reflective particulate material may have a relative error of an amount of the coating on the particulate substrate of about 5% to about 15%, and/or a dust index of about 5 or lower, and/or a staining loss of about 8% to about 11%. A method of manufacturing the reflective particulate material comprises mixing the particulate substrate with a liquid coating composition to form a wet particulate mixture, passing the wet particulate mixture through at least one heat zone to remove water and/or moisture, and curing the coating material in the coating composition.

18 Claims, 5 Drawing Sheets

(56) References Cited

U.S. PATENT DOCUMENTS

2018/0186694 A1\* 7/2018 Lante ...................... C04B 26/26
2019/0100921 A1\* 4/2019 Sexauer ................. E04D 7/005
2020/0407975 A1\* 12/2020 Smith ................ C04B 35/6264

\* cited by examiner

COATED SOLAR REFLECTIVE GRANULES AND METHODS OF MANUFACTURING THE SAME

BACKGROUND

Commercial and residential roofs are continuously exposed to harsh or extreme elements. Even under moderate external conditions, roofs are exposed to environmental or weather conditions that affect their ability to insulate the building or residence interiors from the effects of environmental or weather conditions. During the summer months in many parts of the world, roofs are continuously exposed to high heat and sunny conditions under which the roofing materials absorb solar energy and retain high levels of heat. As the roofs absorb the solar energy and retain the heat, the conditions inside the underlying buildings or residences suffer adversely, often causing the interiors to heat up to uncomfortable conditions. To remedy these conditions, buildings or residences often resort to increased amounts of internal insulation, or increased use of engineered cooling systems (e.g., HVAC equipment). However, increasing the amount of insulation has a limited ability to reduce heat transfer, and increasing energy costs make the increased use of engineered cooling systems undesirable and possibly cost-prohibitive.

In an effort to address this concern and to satisfy California based governmental regulations, roofing material manufacturers strive for high total solar reflectance in order to maintain cooler roof temperatures. However, the state of the art roofing materials (such as asphalt and modified bitumen) are black in color and have correspondingly low solar reflectivities. In an attempt to compensate for this shortcoming, some roofing material manufactures apply lighter colored granules on the asphalt or modified bitumen to increase solar reflectivity. Unfortunately, to date, many of these lighter colored granules or granular layers provide only modest improvements in the solar reflectivity, and the system solar reflectance still falls short of the California Cool Roof minimum total solar reflectance values.

SUMMARY

According to embodiments of the present invention, a reflective particulate material useful for cool roof (and other) applications comprises a particulate substrate, and a coating on the particulate substrate. The coated material may have a relative error (calculated as the standard deviation divided by the average coating level and reported as an error percentage) of an amount of the coating on the particulate substrate of about 5% to about 10%, and/or a dust index of about 0.7 to about 1.8, and/or a staining loss when applied to an asphalt substrate of about no change to about 11%, depending upon the level and type of coating applied.

The coating may include a silane, siloxane, polysiloxane, organo-polysiloxane, silicate, organic silicate, silicone resin, acrylic, urethane, polyurethane, acrylic based fluoropolymers, fluoropolymers and/or glycol ether. The coating may be present in an amount of about 3 wt % or less based on a total weight of the reflective particulate material. In some embodiments, the particulate substrate includes a clay.

A method of manufacturing the reflective particulate material includes mixing the particulate substrate with a liquid coating composition to form a wet particulate mixture, and passing the wet particulate mixture through at least one heat zone to remove water and to at least partially cure the coating material in the coating composition. Mixing the particulate substrate with the liquid coating composition includes metering an amount of the particulate substrate into a mixer, metering an amount of the liquid coating composition into the mixer, and mixing the particulate substrate and the liquid coating composition in the mixer. The mixer may be a paddle mixer having an elongated chamber housing a rotating barrel with a plurality of paddles extending radially from the barrel.

Passing the wet particulate mixture through at least one heat zone may include passing the wet particulate mixture through at least first and second heat zones. To avoid volatilizing low boiling point silanes, the first heat zone may be maintained at a lower temperature than that of the second heat zone.

In some embodiments, passing the wet particulate mixture through the at least one heat zone may include delivering the wet particulate mixture to a fluidized bed dryer. The fluidized bed dryer uses air flow to lift the wet particulate mixture and push the mixture forward along the length of the dryer. The at least one heat zone may include at least first and second heat zones maintained at different temperatures, and the air transfer may first convey the wet particulate mixture past the first heat zone and then past the second heat zone.

The fluidized bed dryer may be coupled to a heater via at least one conduit. The at least one conduit delivers heated air to the at least one heat zone of the fluidized bed dryer to maintain the at least one heat zone at the desired temperature. In some embodiments, the at least one conduit may include a plurality of independent conduits for delivering air to each individual heat (or drying) zone. For example, in some embodiments, the at least one conduit may include at least first and second conduits, and the first conduit can deliver first heated air to the first heat zone to maintain the first heat zone at a first temperature, and the second conduit can deliver second heated air to the second heat zone to maintain the second heat zone at a second temperature.

The heated air passing by the wet particulate mixture through the at least one heat zone generates an exhaust stream, and in some embodiments, this causes the finer particles to separate from the bulk particles. According to some embodiments, filtering the exhaust stream includes delivering the exhaust stream to at least one dust collection device. In some embodiments, the at least one dust collection device may include a plurality of dust collection devices. For example, in some embodiments, the at least one dust collection device comprises at least first and second dust collection devices. The first dust collection device may include a cyclone collector, and the second dust collection device may include a baghouse dust collector. One of the advantages of using a fluidized bed dryer is that the fine dusty particles, which cause customer complaints over dustiness, are automatically removed from the bulk particle stream. It is further hoped that the removed fines could be reused either as grog or as a filler in another industry.

BRIEF DESCRIPTION OF THE DRAWINGS

These and other features and advantages of embodiments of the present disclosure will be better understood with reference to the following detailed description when considered in conjunction with the accompanying drawings, in which.

DETAILED DESCRIPTION

Figure 1:
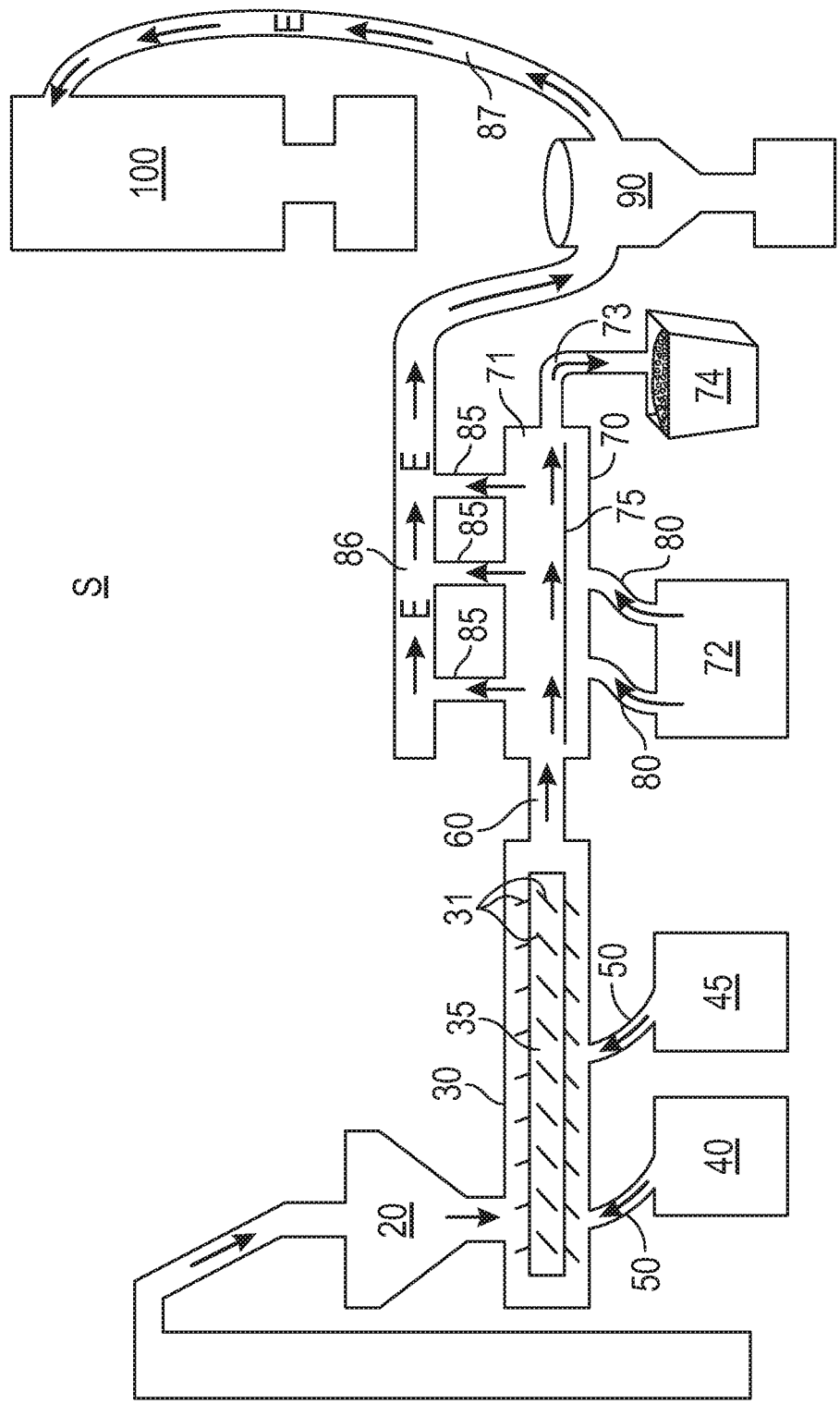
FIG. 1 is a schematic view of a system for manufacturing coated solar reflective particles according to embodiments of the present disclosure.

The reduction of heat transfer from the external environment to the interior working or living space of a building is becoming increasingly important as the cost of energy increases. While the interior space of a residence or building can generally be kept comfortable through engineered cooling systems (e.g., HVAC systems), as energy costs rise, the cost of maintaining a comfortable working or living space also rises. Consequently, methods for reducing the transfer of heat from the external environment to the interior space of a building or residence are desirable. Indeed, such a reduction of heat transfer would reduce the amount of time the artificial cooling systems would need to run to maintain a comfortable interior space, thereby reducing the amount of energy consumed by those cooling systems.

According to embodiments of the present invention, a coated particulate material is useful as solar reflective granules or granular layers in a roofing material. The coated particulate or granular material includes solar reflective granules or particulates having a bulk total solar reflectance (also referred to herein as "total solar reflectance" or simply "solar reflectance") of 70% or greater as measured using a reflectometer from Surface Optics Corporation (San Diego, Calif.). For example, the 410-Solar visible/NIR Portable Reflectometer from Surface Optics Corporation (San Diego, Calif.) may be used, which measures reflectance over 7 distinct wavelength bands and uses an algorithm to calculate the total solar reflectance. In some embodiments, the coated particulate or granular material has a solar reflectance of at least 60%, for example, at least 70% or at least 80%. In some embodiments, the coated particulate material may have a solar reflectance of at least 80%, and in some embodiments, it may have a total solar reflectance of at least 85%, or at least 90%. For example, in some embodiments, the coated particulate material may have a total solar reflectance of 90% or greater. For example, in some embodiments, the coated particulate material has a solar reflectance of 60% to 95%, 70% to 95%, 80% to 95%, 70% to 90%, 80% to 90%, 85% to 95%, or 90% to 95%.

The particulate material according to embodiments of the present invention may have a total solar reflectance within these described ranges, whether the material is coated as described in this disclosure, or the material is uncoated. In some embodiments, however, the uncoated particulate material may have a total solar reflectance different from the corresponding reflectance of the coated counterpart material. For example, in some embodiments, the uncoated particulate material may have a total solar reflectance that is higher than the corresponding reflectance of the coated counterpart material. While the coated and uncoated versions of the particulate material may both have a total solar reflectance within the same range (as discussed above), the coated and uncoated versions of the material may have different total solar reflectance values within the same range.

As used herein, the terms "coated particulate material," "coated granular material," "solar reflective particulates," "solar reflective granules," "reflective particulates," "reflective granules," and like terms are used interchangeably to refer to the particles or granules of material that are coated as described in this disclosure. Additionally, while the particulates and granules described herein are touted for their efficacy in "cool roof" applications, it is understood that the described particulates and granules may have other uses and applications, and that the described embodiments are not limited to "cool roof" applications. For example, in some embodiments, the particulate or granular materials described herein may be useful on any exterior surface, for example, as a filler in an exterior paint, or similar applications.

According to embodiments of the present invention, the reflective particulates or granules include a particulate (or granular) substrate, and a coating on the particulate substrate. The substrate may include any suitable particulate substrate having an appropriate total solar reflectance value before coating. The substrate should have a solar reflectance when uncoated that is sufficiently high that the total solar reflectance of the counterpart coated substrate falls within the ranges discussed above. For example, in some embodiments, the substrate may include any material that exhibits a total solar reflectance (on its own, i.e., prior to coating) of 80% or greater. Non-limiting examples of suitable substrates include transition metal oxides, clays, calcium silicates (e.g., wollastonite) and pyrophyllites. For example, in some embodiments, the substrate may include a transition metal oxide, a calcium silicate (e.g., wollastonite), a pyrophyllite and/or a kaolin clay. In some embodiments, for example, the substrate may include titanium dioxide, a pyrophyllite, a calcium silicate (e.g., wollastonite), a hydrous kaolin clay and/or a calcined kaolin clay. In some embodiments, for example, the substrate may include a clay, for example, a hydrous kaolin clay, or a calcined kaolin clay, one non-limiting example of which is a calcined kaolin chamotte. For example, in some embodiments, the calcined kaolin chamotte may include an oxide profile that is Non-limiting examples of suitable substrates include calcium silicates (e.g., wollastonite), AS 45 chamotte (e.g., having an $SiO_2$ content of about 54.9%, an $Al_2O_3$ content of about 42.4%, and a $K_2O$ content of about 1.4%) available from Amberger Kaolinwerke Eduard Kick GmbH & Co. ("AKW") (an affiliate company of Quarzwerke GmbH) (Hirschau, Germany), EPK kaolin (e.g., having an Fe content of about 0.93 wt %, where the reported Fe content is adjusted to exclude loss-on-ignition (LOI) and normalized to a total oxide content of 100%) available from Edgar Minerals (Edgar, Fla.), MCNAMEE® kaolin (e.g., having an Fe content of about 0.38 wt %, where the reported Fe content is adjusted to exclude LOI and normalized to a total oxide content of 100%) available from Vanderbilt Minerals, LLC (Norwalk, Conn.), Kingsley kaolin (e.g., having an Fe content of 0.45 wt %, where the reported Fe content is adjusted to exclude LOI and normalized to a total oxide content of 100%) available from Kentucky-Tennessee Clay Company (Roswell, Ga.), 6 TILE® kaolin (e.g., having an Fe content of about 0.4 wt %, where the reported Fe content is adjusted to exclude LOI and normalized to a total oxide content of 100%) available from Kentucky-Tennessee Clay Company (Roswell, Ga.), optiKasT kaolin (e.g., having an Fe content of about 0.58 wt %, where the reported Fe content is adjusted to exclude LOI and normalized to a total oxide content of 100%) available from Kentucky-Tennessee Clay Company (Roswell, Ga.), Ione Airfloated Kaolin (e.g., having an Fe content of about 0.7 wt %, where the reported Fe content is adjusted to exclude LOI and normalized to a total oxide content of 100%) available from Ione Minerals, Inc.

(Ione, Calif.), the ASP® line of products (e.g., ASP G90, and ASP G92), M17-052 available from BASF Corporation (Florham Park, N.J.), the PYRAX® line of products (e.g., Pyrax HS) available from R.T. Vanderbilt Company, Inc. (Norwalk, Conn.), and the TK line of products (including, e.g., TK1827, TK1828, TK1912, TK1913, TK1914, TK1915, TK1916, TK1917, with an Fe+Ti content of 0.5% to 1.8%) available from Thiele Kaolin Company (Sandersville, Ga.).

The particle size and particle size distribution of the substrate are not particularly limited. As such, the substrate may have any suitable average particle size, and any suitable particle size distribution, and these values may vary depending on the intended application of the granules (e.g., as a cool roof material on a commercial roof or a residential roof, or as a filler in a paint). Indeed, in embodiments in which the substrate is a mineral, e.g., embodiments in which the substrate includes a clay (e.g., a kaolin clay, or calcined kaolin clay), the average particle size and the particle size distribution may vary depending on the source or supplier of the substrate material.

The coating on the substrate provides weather and UV resistance to the reflective particulates, and is generally hydrophobic and to some degree oleophobic. The hydrophobicity of the coating reduces the amount of moisture or water absorbed by the underlying substrate material, while the oleophobic nature of the coating improves the anti-staining properties and performance. The coating may include a cured or at least partially cured coating composition, and the coating composition may include any suitable material that is generally hydrophobic. As used herein, the term "generally" is used as a term of approximation, and not as a term of degree, and is intended to account for the inherent deviations and variations in measured, observed or calculated properties or values. Accordingly, the term "generally hydrophobic" denotes that the coating composition would be considered hydrophobic by those of ordinary skill in the art, even if, for example, the composition included some hydrophilic or non-hydrophobic moieties or components.

Additionally, the coating may be substantially or completely clear (or white) to minimize any adverse effect on the reflectance of the reflective particulates. As used herein, the term "substantially" is used as a term of approximation, and not as a term of degree, and is intended to account for the inherent deviations and variations in measured, observed or calculated properties or values. Accordingly, the term "substantially clear" denotes that the coating composition would be considered clear by those of ordinary skill in the art viewing the coating with the naked eye, even if, for example, the composition may include some level of color or haze when measured using a measurement instrument or observed under a high-powered microscope.

Some non-limiting examples of suitable materials for the hydrophobic coating include fluoropolymers, fluorosilanes, silanes, siloxanes, polysiloxanes, organopolysiloxanes, silicates, organic silicates, silicone resins, acrylics, urethanes, polyurethanes and glycol ethers. Some non-limiting examples of suitable commercially available coating compositions include the ACRYSHIELD® line of acrylic products from National Coatings Corporation (Camarillo, Calif.), QW77 urethane product available from Henkel Corporation (Dusseldorf, Germany), water-based polyurethanes available from Minwax Company (Upper Saddle River, N.J.), the SITREN® line of products (e.g., Sitren 270 and 595) available from Evonik Corporation (Essen, Germany), the SILRES® line of products (e.g., Silres BS1011A and B1 BS3003) available from Wacker Chemie AG (Munich, Germany), the TEGO® line of products (e.g., Tego XP 5000) available from Evonik Corporation (Essen, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), the KYNAR® line of products (e.g., Kynar RC-10 and 147) available from Arkema (Colombes, France), the RHOPLEX® line of products (e.g., Rhoplex EC 2540) available from The Dow Chemical Company (Midland, Mich.), and the SYCOAT® line of products (e.g., Sycoat 235) available from STI Polymer, Inc. (Sanford, N.C.).

In some embodiments, for example, the coating composition may include a silane, siloxane, fluorosilane and/or fluorosiloxane. Any suitable silane and/or siloxane may be used for the hydrophobic coating. Some non-limiting examples of suitable silane or siloxane materials for the hydrophobic coating include the SILRES® line of products (e.g., the SILRES® BS line of products, for example SILRES® BS 3003, BS-68, BS-60, BS-33A) available from Wacker Chemie AG (Munich, Germany), the DYNASYLAN® line of silanes and siloxanes (e.g., DYNASYLAN® SIVO 112, DYNASYLAN® F 8815 and DYNASYLAN® VPS SIVO 608) available from Evonik Industries AG (Essen, Germany), and the SILQUEST® line of silanes and siloxanes (e.g., SILQUEST® A-1120, SILQUEST® A-1630A and SILQUEST® A-137) available from Momentive Performance Materials, Inc. (Waterford, N.Y.). A single compound (or product) may be used for the hydrophobic coating, or a combination of two or more compounds (or products) may be used.

The amount of the coating may be selected to achieve a specified goal, e.g. low dusting, to obtain hydrophobic behavior, and/or to prevent or reduce asphalt staining. For example, if the coating level is too low, the resulting coated particulates may exhibit excess dusting and/or staining. Conversely, if the coating level is too high, the resulting coated particulates may exhibit excess agglomeration, and/or the cost of production may become prohibitive. In some embodiments, for example, the coating may make up 3 wt % or less of the coated particulate (i.e., the total weight of the substrate and coating). For example, in some embodiments, the coating makes up 2 wt % or less of the coated particulate, and in some embodiments, the coating makes up 1.5 wt % or less of the coated particulate. In some embodiments, for example, the coating may make up from 0.4 wt % to 1.5 wt %, from 0.5 wt % to 1.4 wt %, from 0.6 wt % to 1.3 wt %, from 0.75 wt % to 1.25 wt %, from 0.9 wt % to 1.1 wt %, or from 0.95 wt % to 1.05 wt %. These coating amounts or levels are the amount of the coating after curing the composition. As would be appreciated by those of ordinary skill in the art, the amount, or weight percentage, of the coating composition applied to the substrate particles will be larger than the amounts listed here for the final, cured coating.

According to embodiments of the present disclosure, the coated particulate material includes a generally uniform level of coating on the substrate particles. As used herein, the term "generally" is used as a term of approximation, and not as a term of degree, and is intended to account for the inherent deviations and variations in measured, observed or calculated properties or values. Accordingly, the term "generally uniform" denotes that the coating on the substrate particles would be considered uniform by those of ordinary skill in the art, even if, for example, the coating level is not completely the same on all particles or surfaces of the particles. For example, in some embodiments, the average level of coating (i.e., the amount of coating per surface area after drying and curing) on a sample of the substrate particles (i.e., a sample representing a full particle size distribution) falls within a standard deviation of about 0.05% to about 0.25%, and in some embodiments about 0.05% to about 0.20%, about 0.05% to about 0.15%, or about 0.05% to about 0.10%. In some embodiments, these standard deviations correspond to a relative error (i.e., calculated by dividing the standard deviation by the average amount of coating) of about 5% to about 19%, for example about 5% to about 15%, or about 5% to about 10%. In some embodiments, this uniform coating level is achieved by coating not only the larger particles (i.e., particles that would be retained on a 20-mesh sieve) in a sample representing a full particle size distribution, but also coating the smaller particles (i.e., those that would pass through a 20-mesh sieve).

As used herein, a "sample representing a full particle size distribution" refers to a sample of substrate particles that has not been sifted, sieved or otherwise sorted to remove smaller or larger particle sizes. In contrast, a "sample representing a +20 mesh (or −20 mesh) particle size distribution" refers to a sample of substrate particles that has been sieved by a 20-mesh sieve. In these samples, the "+20 mesh" samples refer to the particles that are retained on the 20-mesh sieve after sieving (also referred to herein as "larger particles"), and the "−20 mesh" samples refer to the particles that pass through the 20-mesh sieve (also referred to herein as "smaller particles"). Additionally, as used herein, the terms "larger particles" and "smaller particles" are used in reference to each other, and with reference to the sample representing the full particle size distribution. For example, the average particle size of the "larger particles" is larger than the average particle size of the sample representing the full particle size distribution, and larger than the average particle size of the smaller particles. Conversely, the average particle size of the "smaller particles" is smaller than the average particle size of the sample representing the full particle size distribution, and smaller than the average particle size of the larger particles. Further, as used herein, "fine," "fines," "fine particles," and like terms are used in their art-recognized senses to refer to particles having an average particle size sufficient to pass through a 100-mesh sieve, e.g., an average particle size that is less than 150 microns. Similarly, as used herein, "coarse particles" and like terms are also used in their art-recognized senses to refer to particles having an average particle size sufficient to be retained on a 100-mesh sieve, e.g., an average particle size greater than 150 microns.

In some embodiments, for example, the average amount of coating (i.e., the amount of coating after drying and curing) on a +20-mesh sample of the substrate particles falls within a standard deviation of about 0.05% to about 0.25%, and in some embodiments about 0.05% to about 0.20%, about 0.05% to about 0.15%, or about 0.05% to about 0.10%. In some embodiments, the +20-mesh sample may have an amount of coating within the same standard deviation as the sample representing the full particle size distribution. However, in some embodiments, the +20-mesh sample may have an amount of coating that is different (i.e., either higher or lower) than the standard deviation of the sample representing the full particle size distribution.

Similarly, in some embodiments, the average amount of coating (i.e., the amount of coating after drying and curing) on a −20-mesh sample of the substrate particles falls within a standard deviation of about 0.05% to about 0.25%, and in some embodiments about 0.05% to about 0.20%, about 0.05% to about 0.15%, or about 0.05% to about 0.10%. In some embodiments, the −20-mesh sample may have an amount of coating within the same standard deviation as the sample representing the full particle size distribution. However, in some embodiments, the −20-mesh sample may have an amount of coating that is different (i.e., either higher or lower) than the standard deviation of the sample representing the full particle size distribution.

In some embodiments, for example, the −20-mesh sample may have an amount of coating that is greater than the standard deviation of the sample representing the full particle size distribution, while the +20-mesh sample may have an amount of coating that is less than the standard deviation of the sample representing the full particle size distribution. This is because the −20-mesh sample is made up of particles having smaller particle sizes (and thus has greater surface area) while the +20-mesh sample is made up of particles having larger particle sizes (and thus has lesser surface area). However, when the +20-mesh sample and the −20-mesh sample are considered together in the sample representing the full particle size distribution, the sample including both the +20-mesh samples and the −20-mesh samples (i.e., the sample representing the full particle size distribution) will have the standard deviations discussed above.

The amount of the uniform coating on the substrate particles can be any desirable amount, and may vary depending on the material of the substrate particles. In some embodiments, the amount of the uniform coating should be sufficient to coat, substantially coat or completely coat each particle in order to reduce dust levels and improve stain resistance. In some embodiments, for example, the amount of the coating on the substrate particles may be about 0.5 wt % to about 1.5 wt %, for example, 0.5 wt % to about 1.0 wt %, about 0.75 wt % to about 1.5 wt %, or about 0.75 wt % to about 1.0 wt %. As discussed above, the amount of the coating on the substrate particles may be within these ranges and within the standard deviations discussed herein. As an example, the amount of coating in a sample of the coating particles representing the full particle size distribution may be about 1.0 wt %±0.05 wt %, or about 0.75 wt %±0.05 wt %. However, it is understood that any amount of coating may be used as desired so long as the amount of coating is generally uniform, i.e., satisfies the standard deviations discussed herein.

In addition to a generally uniform amount of coating, in some embodiments, the coated substrate particles have a reduced amount of dust (or dust level). The amount of dust in a sample of the coated substrate particles is represented by a dust index, which measures the quantity of dust in the sample. The dust index may be measured by the DustMon dust measurement device (available from Microtrac Inc., Montgomeryville, Pa.). The dust index is a measure of airborne dust in a sample of particles. To determine the dust index, particles are dropped into a sample container at the top of a fixed length of pipe, and the particles drop into a sample collector at the other end of the pipe. When the particles land in the sample collector, air currents and the force of the impact cause the sample dust to travel back upwards to a measurement area which contains a light source and a detector. The detector detects changes in light intensity from the light source. Sample dust obstructs a portion of the light from the light source, and the detector senses the decrease in light intensity, and outputs a dust index based on the decrease in light intensity. The dust index is the sum of the maximum dust concentration plus the dust concentration after 30 seconds. The dust concentration is reported in percentage (%), where 100% refers to complete blockage of light from the light source at the detector.

In some embodiments, the coated substrate particles have a dust index (as measured by DustMon) of less than 5, and in some embodiments, less than 2. For example, in some embodiments, the coated substrate particles have a dust index of about 0.7 to about 1.8, for example about 0.8 to about 1.6, about 0.9 to about 1.5, or about 0.9 to about 1.2. Additionally, in some embodiments, the dust index of the coated particles may have a standard deviation of about 0.2 to about 0.5, for example about 0.3 to about 0.4, or about 0.3. As an example, the coated substrate particles may have a dust index of about 0.9±0.3, or about 1.2±0.3.

As a point of comparison, uncoated substrate particles can have a dust index of over 20, for example, some uncoated clay particles have a dust index of 19.4 to 27.4, or 22.7 in some embodiments. Additionally, particles coated by a process different from those described herein have much higher dust indices. For example, particles coated by a conventional process may have a dust index of over 3, for example, from 3 to 5, 3 to 4, or 3.4 to 3.8. As can be seen from this comparison, the coated particles according to embodiments of the present invention have significantly reduced dust indices compared to both uncoated substrate particles as well as particles coated by different processes.

In addition to improved coating uniformity and dust levels, the coated substrate particles according to embodiments of the present invention impart improved staining performance. For example, in embodiments in which the coated particles are employed in a roofing application, the coated particles show improved resistance to staining from the underlying roofing material (e.g., asphalt). The staining tendency of the granules can be measured by placing the roofing material (e.g., asphalt coated or covered with the coated particles) in an 80° C. dark oven and measuring the material's reflectance loss over time. For example, the staining tendency may be measured by subjecting the material to a 14 day dark aging test in which the roofing material (e.g., asphalt coated or covered with the coated particles) is placed in an 80° C. dark oven and staining measurements are taken at various intervals (e.g., when the samples are made, and after 4, 7 and 14 days aging). The staining loss is taken as the difference in value between the measurement taken at 14 days aging and the initial measurement taken when the samples are made. According to embodiments of the present disclosure, roofing materials (e.g., asphalt) that include the coated substrate particles described herein register an average staining loss of less than 11%, for example, less than 10% or less than 9%. In some embodiments, for example, roofing materials that include the coated substrate particles described herein register an average staining loss of about 5% to about 11%, for example about 6% to about 11%, about 6% to about 10%, or about 6% to about 9.5%. And in some embodiments, for example, the roofing materials may register an average staining loss of about 8% to about 11%, for example about 9% to about 11%, about 9% to about 10%, or about 9% to about 9.5%. In significant contrast, roofing materials (e.g., asphalt) that include coated particles that are coated by a different or conventional method exhibit much greater staining losses, e.g., losses of 12.9% or greater, or 20.1% or greater. As can be seen from this comparison, the coated substrate particles according to embodiments of the present disclosure exhibit significantly improved stain resistance.

A system for coating substrate particles, according to embodiments of the present invention, is shown in FIG. 1. The system S includes a dry material (or particle) delivery apparatus 20 for delivering the dry (uncoated) substrate particles or granules to a mixer 30. The mixer 30 is coupled or connected to at least one coating container 40 and/or 45 via coating pipe(s) (or hoses) 50. At least one of the coating container(s) 40 and/or 45 contains a liquid coating composition for coating the dry substrate particles. The other of the coating container(s) 40 and/or 45 may include either additional liquid coating composition or may include water (or other suitable solvent or diluent) for diluting or adjusting the concentration of the coating composition. The system S further includes a pump (not shown) for pumping the coating composition into the mixer.

The dry material delivery apparatus 20 may be any suitable delivery apparatus, so long as it is can deliver (e.g., controllably deliver or uniformly deliver) the dry material (or particles) into the mixer 30. For example, the dry material delivery apparatus 20 may be any suitable gravity-based or gravimetric delivery device. For example, in some embodiments, the dry material delivery device 20 may be a natural mass balance device, delivering the dry material through an orifice from a position that is a minimum height above the orifice. This type of dry material delivery apparatus 20 can be used to control the flow of the dry material into the mixer by adjusting the size of the orifice. Equation 1, below, governs the flow of solids through an orifice, and can be used to determine the orifice diameter needed to achieve the desired flow.

$$W = C\, \rho_b g^{1/2} (D_o - k\, d_p)^{5/2} \qquad \text{Equation 1}$$

In Equation 1, W is the average mass discharge rate, C is the discharge coefficient, k is the shape coefficient, g is the acceleration due to gravity, $D_o$ is the diameter of the outlet orifice, and $d_p$ is the particle diameter. For this equation to be valid, the height above the orifice diameter must exceed 2.5 times the diameter of the orifice, and in some embodiments, exceeds $D_o + 30\, d_p$ (assuming that $D_o$ is much greater than $d_p$).

In some embodiments, however, the dry material delivery device 20 may be a loss-in-weight feeder. As understood by those of ordinary skill in the art, loss-in-weight feeders meter the delivery of a material by monitoring the loss in weight from a material container or hopper and adjusting the feed rate based on the loss in weight over time. Loss-in-weight feeders are well known in the art, and any suitable loss-in-weight feeder can be used with the systems according to embodiments of the present disclosure.

The mixer 30 may be any suitable mixing apparatus or equipment capable of mixing the dry substrate particles received from the hopper 20 and the coating composition from the coating container(s) 40 and 45 and forcing the mixture forward through the system (i.e., forcing the mixture to the right in the drawing in FIG. 1). For example, in some embodiments, the mixer 30 may include a paddle mixer or alternatively a fluidized bed coating system (or sprayer). The paddle mixer employs a series of paddles 31 arranged on a rotating barrel 35 that extends along the length of the mixer. The paddles may have any suitable shape and geometry and may be rotated at any suitable speed so long as they minimize (or do not cause) any particle size degradation. To mix the dry substrate material received from the hopper with the liquid coating material received from the coating container(s) 40 and/or 45 (via conduit(s) 50), the rotating barrel 35 rotates about the longitudinal axis of the mixer 30. This rotation brings the paddles 31 into contact with the wet particle mixture, agitating the mixture, thereby mixing the coating composition with the dry material. Additionally, in some embodiments, the paddles 31 are arranged on the rotating barrel 35 at an angle relative to the longitudinal axis of the barrel 35 and the mixer 30. Arranging the paddles 31 at an angle relative to the longitudinal axis enables gentler mixing of the coating composition with the particles and minimizes particle size degradation due to the physicality of the mixing operation. The angle of the paddles also pushes the wet mixture forward (i.e., to the right in FIG. 1) as the barrel rotates. The angle of the paddles is not particularly limited so long as the paddles are arranged to minimize particle size damage or degradation in the wet mixture and can push the wet mixture forward along the length of the mixer. In some embodiments, however, the paddles are arranged at an angle relative to the longitudinal axis of the barrel of about 30° to about 60°, for example about 35° to about 55°, about 40° to about 50°, or about 45°.

Because the paddle mixer physically mixes the dry particles with the liquid coating material, the paddle mixer can achieve effective coating of the dry particles with less water (or other solvent or diluent) to dilute the coating material as it enters the mixer. As such, the paddle mixer is a lower cost option for effectively coating the dry granules (or particles). Specifically, because the paddle mixer can effectively coat the dry particles with less diluent (or, in some embodiments, no added diluent), the paddle mixer can produce the coated particles in less time and using less energy (e.g., the subsequent drying procedure will take less time and use less energy due to the reduced amount of diluent that needs to be removed or dried).

In contrast, the fluidized bed coater (or sprayer) is gentler on the dry granules (or particles) because it sprays a coating on fluidized particles that will not degrade (or will minimize degradation) size wise. This gentler treatment of the particles will generally maintain their average particle size, which can be beneficial in reducing dust.

The coating composition in the coating container(s) 40 and/or 45 is a liquid composition and can include any composition suitable for coating the dry materials at the desired dry coating level (i.e., the surface treatment or coating level or amount on the particles after drying and curing of the coating composition). For example, in some embodiments, the coating composition includes any of the coating materials discussed above in connection with the coated particles (e.g., any of the silanes, siloxanes, polysiloxanes, organo-polysiloxanes, silicates, organic silicates, silicone resins, acrylics, urethanes, polyurethanes, acrylic based fluoropolymers, fluoropolymers, fluorosilanes and/or glycol ethers discussed above). The coating composition may include any one or combination of these materials and may or may not include a diluent (such as, for example, water).

As used herein, the term "diluent" refers to the purposeful addition of a diluent to the coating material (which may already be in liquid form). For example, while many of the suitable coating materials noted above may already include some water, the "diluent" as used herein refers to any added water (or other diluent) added to the coating material (e.g., water added to the coating material product after obtaining that material from the commercial manufacturer). In embodiments in which the coating composition includes a coating material and a diluent (e.g., added water), the amount of the diluent is not particularly limited, and may be any amount suitable for ensuring effective coating of the dry particles at the desired treatment or coating level (i.e., amount of cured coating). Indeed, the amount of diluent may vary depending on the desired treatment level (i.e., the desired amount of dried/cured coating on the particles after completion of the coating procedure). However, in embodiments employing larger amounts of diluent, larger amounts of energy must be used to evaporate the diluent. Accordingly, the amount of diluent is generally selected to balance the desired coating level while minimizing drying/curing costs. In some embodiments, for example, the coating composition may include the diluent (e.g., added water) in an amount sufficient to provide a coating composition (i.e., including the coating material and the diluent) having a solids content of about 30 wt % to about 50 wt %, for example about 35 wt % to about 45 wt %, or about 40 wt %, based on the total weight of the liquid coating composition. As the "raw" coating materials will differ in the amount of water (or other diluent) present in the product when received from the commercial manufacturer, the specific amount of diluent needed to achieve the above noted solids content will also differ depending on the coating material product used in the coating composition.

In addition to the diluent (when present), the coating composition also includes the coating material. As noted above, the coating material may be any one or a combination of the coating materials discussed above in connection with the coated particles embodiments. The amount of the coating material is also not particularly limited, and may be any amount suitable to achieve the desired treatment level (or coating amount) on the particles. As discussed above in connection with the amount of diluent, the composition of the coating composition may vary depending on the desired treatment level (or amount of cured coating) and coating material product. In some example embodiments, however, while the "raw" coating material may have a higher solids content, the coating composition may include the coating material in an amount sufficient to provide a solids content of about 30 wt % to about 50 wt %, for example about 35 wt % to about 45 wt %, or about 40 wt %, based on the total weight of the liquid coating composition.

The coating material and the diluent (when used) can be introduced into the mixer (via the pipe(s) 50) by any suitable means. However, in some embodiments, as noted above, the coating material and diluent (when used) may be introduced to the mixer by a pump and spraying system (not shown). Any suitable pump can be used, and the pump may be adjusted to modify the set flow rate as desired. In some embodiments, the pump may be a constant volume output pump, a positive displacement pump or solid displacement pump. Nonlimiting examples of suitable pumps include gear pumps, peristatic pumps and lobe pumps.

After mixing the dry particles and the coating composition in the mixer 30, the wet particle mixture is delivered to a drying and curing apparatus 70 via a delivery device or mechanism 60. The delivery device 60 is not particularly limited, and may be any device or apparatus that is capable of delivering the wet particle mixture from the mixer 30 into the drying/curing apparatus 70. In some embodiments, for example, the delivery device 60 may simply be a hole or aperture at the end of the mixer 30 (or on the bottom of the mixer) through which the wet material passes as the mixer forces the material forward (i.e., to the right of in FIG. 1). In some example embodiments, however, the delivery device 60 may be a die (e.g., a downward delivering die) through which the wet material is forced as the mixer forces the material forward (i.e., to the right in FIG. 1). The die (e.g., the downward delivering die) forces the wet mixture out (e.g., downward) from the mixer into the drying/curing apparatus 70. Alternatively, the aperture at the end of the mixer (or the die) may be connected to a conveyor belt or similar conveyance device or apparatus capable of feeding the wet mixture to the drying/curing apparatus 70.

Figure 1A:
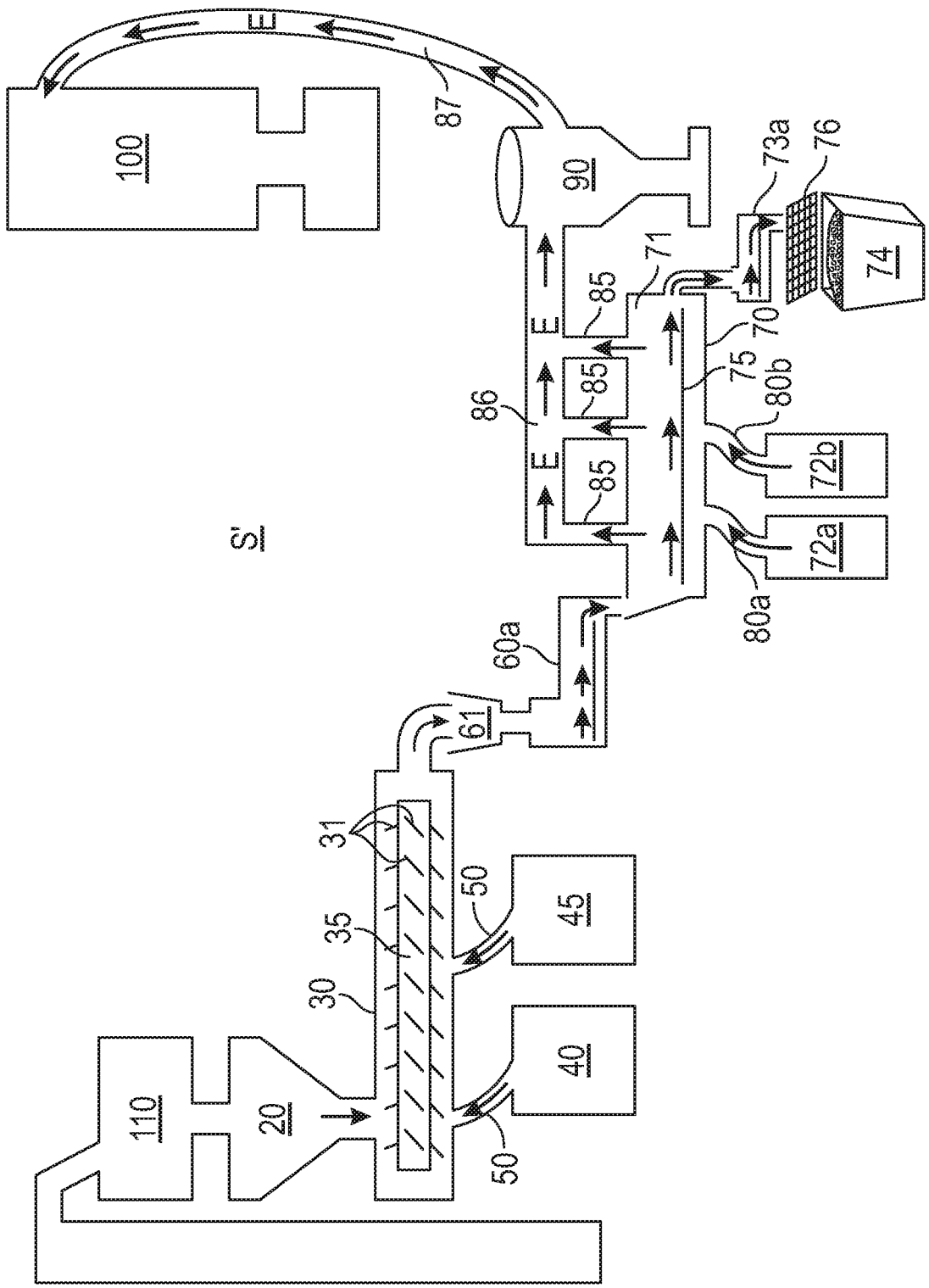
FIG. 1A is a schematic view of a system for manufacturing coated solar reflective particles according to embodiments of the present disclosure.

In some embodiments, as shown generally in the system S' of FIG. 1A, the aperture at the end of the mixer may be connected to a wet mixture container 61 that houses the wet mixture prior to delivery to the drying/curing apparatus 70. The wet mixture container 61 can feed the wet mixture directly into the drying/curing apparatus 70 or may feed the wet mixture to a conveyance device 60*a*. The wet mixture container 61 can be any suitable such container for housing the wet mixture for delivery to either the conveyance device 60*a* or the dryer 70. In some embodiments, however, the wet mixture container 61 may be a vibrating container or vibrating discharger that vibrates during the feeding operation to help break up agglomerated particles and ensure a more uniform feeding operation into the dryer. Nonlimiting examples of suitable such vibrating containers or vibrating dischargers include the vibratory feeders available from CARRIER® Vibrating Equipment, Inc. (Louisville, Ky.) and the vibrating bin dischargers available from CARMAN® Industries, Inc. (Jeffersonville, Ind.).

The conveyance device 60*a* may be the die or conveyor belt discussed above in connection with FIG. 1, but in some embodiments, the conveyance device 60*a* may be a vibrating feeder, such as a vibrating conveyor belt (that may be enclosed to prevent product loss). Nonlimiting examples of such vibrating conveyors include the vibrating conveyors available from CARRIER® Vibrating Equipment, Inc. (Louisville, Ky.) and the vibrating feeders available from CARMAN® Industries, Inc. (Jeffersonville, Ind.).

The drying/curing apparatus 70 may be any suitable apparatus capable of drying and curing the wet material to crosslink the coating material on the substrate particles. In some embodiments, the drying and curing apparatus 70 is a fluidized bed dryer. Fluidized bed dryers are known in the relevant field, and any suitable fluidized bed dryer (including vibrating and non-vibrating dryers) can be used in embodiments of the present disclosures. For example, in some embodiments, the fluidized bed dryer 70 may include an enclosed and elongated chamber 71. The fluidized bed dryer 70 is connected to a heating system 72 that includes a heating element that preheats air and a fan or blower that delivers the heated air to the elongated chamber 71 via at least one (and in some embodiments, at least two) hot air conduits 80. The heating system 72 is not particularly limited and can be any suitable heating system capable of heating air to the desired temperature and delivering that air to the elongated chamber 71 via the conduit(s) 80, and optionally a series of screens/diverters that uniformly apply the air. One non-limiting example of a suitable such heating system includes a flame preheater.

Additionally, the conduit(s) 80 can be connected to the elongated chamber 71 at any suitable position, but in some embodiments, the conduit(s) are connected to the elongated chamber 71 such that the hot air enters the elongated chamber 71 at a position beneath the wet particles. For example, the elongated chamber 71 may include a substrate 75 on which the wet particles are supported upon delivery to the chamber 71. The substrate 75 may have any suitable shape and construction so long as it is permeable to the air from the heating system 72. For example, in some embodiments, the substrate 75 may be a perforated substrate or a grate through which the air flows to thereby lift (or blow) the particles upward within the chamber 71.

Such a configuration of the elongated chamber 71 and hot air conduit(s) 80 allows the hot air to rise up through the substrate 75 to lift the wet particles upward within the chamber as well as to force the particles forward along the length of the chamber 71. While air flow directly upward through the wet particles forces the wet particles forward along the length of the chamber 71, in some embodiments, the heating system 72 and hot air conduit(s) 80 may be configured to deliver the air to the chamber at an angle. Any suitable angle may be used for this purpose, without limitation, and the angle may be selected based on various factors, e.g., the desired speed for the drying operation.

Also, while the substrate 75 and/or chamber may remain stationary (as in conventional fluid bed dryers), in some embodiments, the substrate 75 and/or the elongated chamber 71 may vibrate during operation to help fluidize the wet particles and move them forward along the length of the chamber 71. Nonlimiting examples of suitable such vibrating fluidized bed dryers include the vibrating fluid bed dryers available from CARRIER® Vibrating Equipment, Inc. (Louisville, Ky.).

As the hot air passes through the wet particles, uncoated fine particles will be swept further upward and become suspended in the hot air near the top of the chamber 71, creating an exhaust stream E with suspended fine particles. This exhaust stream E vents out of the elongated chamber 71 through at least one (for example, at least two, or at least three) air vents 85 at the top of the elongated chamber 71. The air vents 85 deliver the exhaust stream E to a common exhaust conduit 86, which delivers the exhaust stream E (with suspended fine particles) to a first dust or fine particle collection device 90. The first dust or fine particle collection device 90 is not particularly limited, and can be any device suitable for separating or collecting dust or fine particles from a gaseous stream. One non-limiting example of a suitable device for the first dust (or fine particle) collection or separation device 90 is a cyclone separator (or cyclone filter, or cyclone collector). Cyclone separators are known in the relevant field, and any suitable such cyclone separator or collector may be used as the first dust (or fine particle) collection or separation device 90.

In some embodiments, the exhaust stream E can be delivered to a second dust collection or separation device 100 via a second exhaust conduit 87 extending from the first dust collection or separation device 90. Like the first dust collection or separation device 90, the second dust collection or separation device 100 can be any suitable device capable of separating or collecting dust from a gas or air stream. Non-limiting examples of suitable such dust collection devices include filters, baghouse dust collectors, wet scrubbers, and electrostatic precipitators. Filters, baghouse dust collectors, wet scrubbers and electrostatic precipitators are known in the relevant field, and any suitable such devices can be used as the second dust collection or separation device 100. However, according to some embodiments, the second dust collection or separation device 100 may be a baghouse dust collector.

Additionally, in some embodiments, as described above, the exhaust stream E can be delivered first to the first dust collection or separation device 90 and then to the second dust collection or separation device 100. However, in some embodiments, the exhaust stream E can be delivered only to the first dust collection or separation device 90, or only to the second dust collection or separation device 100. In these embodiments, the dust collection or separation device that is not being used may be omitted from the system. However, it is understood that the use of one, but not both, dust collection or separation devices may result in insufficient dust removal from the exhaust stream, which may result in system inefficiencies or regulatory failures (e.g., the amount of dust in the air leaving the dust collection or separation device may not comport with regulatory requirements).

Returning to the drying and curing apparatus 70 (e.g., the fluidized bed dryer), the particles that remain in the chamber 71 (i.e., those that are not suspended in the exhaust stream) undergo both drying and curing reactions due to their exposure to the hot air entering the elongated chamber 71. In particular, the hot air both drives off the moisture in the wet mixture, and facilitates crosslinking of the coating material, yielding the coated substrate particles. Upon reaching the end of the fluidized bed dryer (i.e., the right end of the dryer in FIG. 1), the particles are delivered to a coated particle container 74 via a product delivery conduit 73. Neither the coated particle container 74 nor the product delivery conduit 73 is particularly limited, and each of these components may have any suitable shape, construction or configuration. In fact, in some embodiments, the product delivery conduit 73 may simply be an opening at the end of the dryer 70 through which the coated particles pass and then fall into the coated particle container 74 via the conduit 73. Alternatively, as shown in FIG. 1A, the opening at the end of the dryer 70 may be connected to a conveyor belt 73a or similar conveyance device or apparatus capable of delivering the coated particles to the container 74 or other location. In some embodiments, the conveyor belt 73a (or conveyance device) may be a vibrating conveyor, nonlimiting examples of which include the vibrating conveyors available from CARRIER® Vibrating Equipment, Inc. (Louisville, Ky.) and CARMAN® Industries, Inc. (Jeffersonville, Ind.).

In some embodiments, as shown generally in FIG. 1A, the product delivery conduit 73 may include a screen 76 having a suitable mesh to retain any agglomerates coming off the fluidized bed dryer but allow all other particles to pass. The screen 76 may be any suitable mesh size, which may vary depending on the desired final particle size. In some embodiments, the screen may be an 8-10 mesh sieve, for example an 8-mesh sieve. Additionally, while FIG. 1A depicts the screen at the opening to the coated particle container 74, it is understood that the screen 76 can be positioned anywhere between the dryer 70 and the coated particle container 74. For example, in some embodiments, the screen 76 may be positioned at the opening at the end of the dryer (either inside or outside the dryer 70), anywhere along the length of the conduit 73, at the opening to the coated particle container 74 (as shown in FIG. 1A), at the opening to the conveyor belt 73a, or at the exit of the of the conveyor belt 73a.

The elongated chamber 71 of the fluidized bed dryer 70 may have any length suitable to achieve effective drying and crosslinking. For example, in some embodiments, the fluidized bed dryer may have a length of about 10 feet to about 30 feet, for example about 15 feet to about 25 feet, or about 20 feet.

Additionally, in some embodiments, the fluidized bed dryer 70 may include a single heat zone, or two or more heat zones. In embodiments in which the fluidized bed dryer has a single heat zone, the temperature of the single heat zone may be any suitable temperature capable of driving off the moisture in the coating composition, and curing (or crosslinking) the coating material of the coating composition. For example, in some embodiments, the single heat station may be maintained at a temperature of about 130° C. to about 170° C., for example about 130° C. to about 165° C.

In embodiments in which the fluidized bed dryer has more than one heat zone, the fluidized bed dryer may include a first heat zone that is maintained at a temperature lower than a second heat zone. Such a configuration of the drying and curing apparatus 70 can enable more efficient curing of the coating material on the particles due to the retention of lower molecular weight silane that may otherwise volatilize. In particular, as discussed above, the wet particles are exposed to hot air from the hot air conduits 80, which drives off moisture and promotes crosslinking of the coating material. However, when exposed to temperatures higher than the boiling points of the components, some of the coating material will volatilize instead of crosslinking, and enter the exhaust stream instead of coating the particles. As an example of this phenomenon, in a coating composition including 40% water and 60% solids, the final product will include 25% cross-linked coating material. The remainder of the coating material becomes water, alcohol or other volatile organic compounds (VOC) upon exposure the heat needed to cure (or cross-link). To minimize or reduce this volatilization of the coating material, some embodiments of the fluidized bed dryer include a first heat zone in which the particles are subjected to a lower temperature, for example a temperature of about 90° C. to about 120 ° C., about 95° C. to about 110° C., or about 100° C. to about 105° C. In this first heat zone, the heat is sufficient to drive off moisture, and begin the curing (or cross-linking) process, but is not high enough to volatilize lower molecular weight coating species. As such, the particles leaving the first heat zone may be generally dry (i.e., the water, or moisture, has been substantially or completely driven off), and the coating material may be partially cured.

After passing through the first heat zone maintained at the lower temperature, the partially cured particles may then pass through a second heat zone maintained at a higher temperature. As used herein, the terms "higher temperature" and "lower temperature" are used in reference to each other. For example, the lower temperature of the first heat station is lower than the "higher" temperature of the second heat station. Conversely, the higher temperature of the second heat station is higher than the "lower" temperature of the first heat station. As the particles passing through the second heat zone are partially cured, they can withstand a higher temperature without losing a large amount of organic material (through volatilization). Accordingly, the second heat zone can be maintained at a higher temperature to promote faster curing of the coating material. In some embodiments, for example, the second heat zone may be maintained at a temperature of about 130° C. to about 170° C., for example about 130° C. to about 165° C., or 135° C. to about 150° C.

The first and second heat zones may be maintained at their respective temperatures by any suitable means. However, in some embodiments, the temperatures of these zones are maintained by the heating system 72 and the hot air conduits 80. For example, in some embodiments, a first one of the hot air conduits 80 may be used to maintain the temperature of the first heat zone, and a second one of the conduits 80 may be used to maintain the temperature of the second heat zone. In some embodiments, two heating systems 72 may be used (as shown generally in FIG. 1A), and a first one of the heating systems 72a may be connected to the first conduit 80a and used to control the temperature of the first heat zone, and the second one of the heating systems 72b may be connected to the second conduit 80b and used to control the temperature of the second heat zone.

After passing through the drying and curing apparatus 70, the coated particulate product exits the drying and curing apparatus 70 and is ready for storage or packaging. As shown in FIG. 1, the coated product may be collected in a coated product container 74 and transported elsewhere for storage. However, in some embodiments, the coated product can be transported from the drying and curing apparatus to a conveyor (not shown) that conveys (or transports) the coated product to a silo or other storage apparatus (not shown), or to a packaging apparatus (not shown) for loading the coated product into bags or other packages. Conveyors, silos and packaging apparatuses are well known in the relevant field, and any suitable such components, apparatuses and configurations may be used with embodiments according to the present disclosure.

In some embodiments, the system S may further include a pre-fines removal apparatus 110, as shown in FIG. 1A. As used herein, "pre-fines" refer to fine particles in the dry material prior to coating. The pre-fines removal apparatus 110 may be any suitable device capable of removing fine particles from the dry material prior to coating, and is not limited. However, in some embodiments, the pre-fines removal apparatus 110 may include an aspirator system. As would be understood by those of ordinary skill in the art, aspirator systems use air to remove dust and fine particles from the dry material. Suitable aspirator systems for this purpose are well known to those of ordinary skill in the art, and any suitable commercially available aspirator system may be used in the systems described herein. Some non-limiting examples of suitable aspirator systems include the MULTI-ASPIRATOR® line of aspirators available from Kice Industries, Inc. (Wichita, Kans.), and similar systems. Additionally, while FIG. 1A depicts the aspirator system 110 upstream of the dry material delivery device 20, it is understood that the aspirator system may be installed anywhere in the system upstream of the mixer 30. For example, instead of being upstream of the dry material delivery apparatus 20, the aspirator system 110 may be downstream of the dry material delivery apparatus 20 and upstream of the mixer 30 so that the aspirator system 110 delivers the aspirated dry material into the mixer 30.

Additionally, in some embodiments, the system S may further include a filtering apparatus 115 for filtering the dried and cured material exiting the drying/curing apparatus 70. The filtering apparatus 115 serves to remove agglomerated particles exiting the drying/curing apparatus 70, and can be any suitable filtering apparatus capable of accomplishing that goal. Filtering apparatuses for this purpose are well known to those of ordinary skill in the art, and any suitable such filtering apparatus may be used in the systems described herein. However, in some embodiments, the filtering apparatus 115 may include a screen at the end of the drying/curing apparatus. The screen may be selected to allow passage of particles having a specified size while retaining (or preventing passage of) particles having sizes larger than the specified size. For example, in some embodiments, the screen may include an 8-10 mesh sieve, e.g., an 8-mesh sieve. As shown in FIG. 1A, the filtering apparatus 115 may be positioned at the outlet of the drying/curing apparatus such that the dried and cured granules pass through the filtering apparatus 115 before entering the product delivery conduit 73. However, it is understood that the filtering apparatus 115 may be placed anywhere downstream of the drying/curing apparatus 70, including, for example, anywhere within or along the product delivery conduit 73, at the end of the product delivery conduit 73 that opens into the product storage container 74, or on the product storage container 74 itself.

Figure 2A:
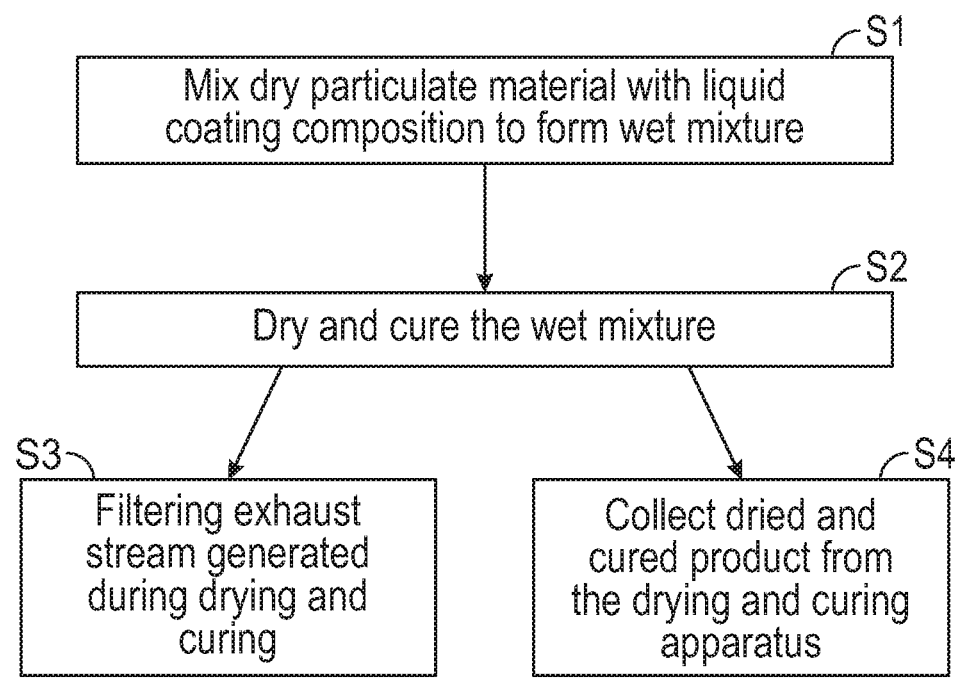
FIGS. 2A and 2B are flowcharts that depict methods of manufacturing coated solar reflective particles according to embodiments of the present disclosure.
Figure 2B:
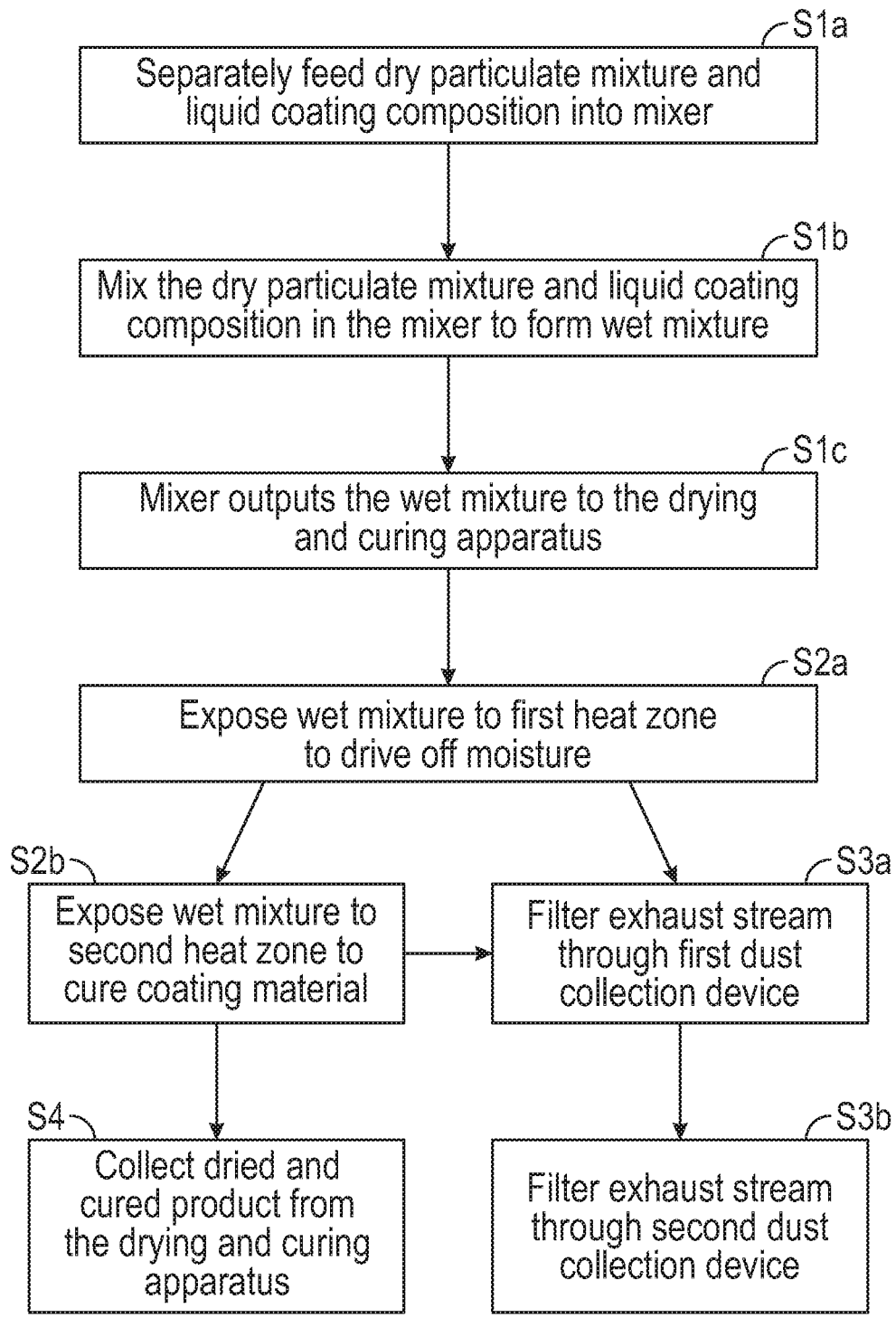

According to embodiments of the present disclosure, a method of making the solar reflective particles described herein uses the system described herein. In particular, the method includes coating substrate particles with a hydrophobic coating. Example methods according to embodiments of the present disclosure are shown in FIGS. 2A and 2B. As shown in FIG. 2A, a method according to embodiments of the present disclosure includes mixing a dry particulate material and a liquid coating composition to form a wet mixture (S1), drying and curing the wet mixture (S2), and filtering fine particles out of an exhaust stream generated during the drying and curing process (S3).

As described above in connection with the system S, and as also shown in FIG. 2B, in some embodiments, the mixing of the particulate material and a liquid coating composition to form a wet mixture includes separately feeding (S1a) the dry material (i.e., the substrate particles) and the coating composition into the mixer 30 (as shown in FIG. 1). The mixer 30 mixes the dry material and the liquid coating composition (S1b), and outputs the wet mixture (S1c) to the drying/curing apparatus 70 (as shown in FIG. 1).

The drying/curing apparatus 70 dries the wet mixture and cures the coating material in the coating composition. As discussed above in connection with the system S, the drying/curing apparatus 70 may include a fluidized bed dryer having first and second heat zones. The first heat zone can be maintained at a temperature configured to dry the wet mixture (e.g., drive off the moisture or water in the wet mixture) (S2a) and potentially partially cure some of the coating material in the wet mixture, and the second heat zone may be maintained at a higher temperature configured to cure (or cross-link) the coating material (S2b).

In some embodiments, the drying and curing process (S2) includes passing preheated air through the wet mixture to drive off moisture and cure (or cross-link) the coating material in the coating composition. In passing the preheated air through the wet mixture, fine particles are blown out of the wet mixture and become suspended in the exhaust stream E, as discussed above in connection with the system S. According to embodiments of the method, this exhaust stream E is filtered (S3) to remove (or reduce the amount of) these fine particles. In some embodiments, this filtering (S3) includes passing the exhaust stream E through either the first dust collection or separation device 90 (S3a) or the second dust collection or separation device 100 (S3b). However, in some example embodiments, the exhaust stream E is passed through both the first dust collection or separation device (S3a) and the second dust collection or separation device (S3b).

At the same time as the exhaust stream E is filtered, the wet mixture is dried and cured in the drying/curing apparatus 70. As the wet mixture travels along the drying/curing apparatus 70, the mixture is dried and cured due to the hot air introduced in the elongated chamber 71. When the mixture reaches the end (i.e., the right end in FIGS. 1 and 1A) of the elongated chamber 71, the coating is dried and cured (cross-linked), yielding a dry, coated particulate product.

This coated particulate product is collected (S4) from the drying/curing apparatus by any suitable means. For example, as discussed above in connection with the system S, the coated particulate product may be collected in a coated product container (or bin) 74 and transported elsewhere for storage, use or sale. Alternatively, as also discussed above in connection with the system S, the coated particulate product can be transferred from the drying and curing apparatus 70 to a conveyor that conveys (or otherwise transports) the product to a silo (or other storage apparatus) or to a packaging (or bagging) device or apparatus.

The systems and methods according to embodiments of the present disclosure yield significantly improved coated reflective particulates. In particular, the systems and methods according to embodiments of the present disclosure mix the substrate particles with the coating composition, which results in coating the individual substrate particles. This individualized coating results in significantly improved coating uniformity and dust control, and the improved coating uniformity results in better hydrophobicity of the coating and better water repellency of the coated particulates.

Figure 3:
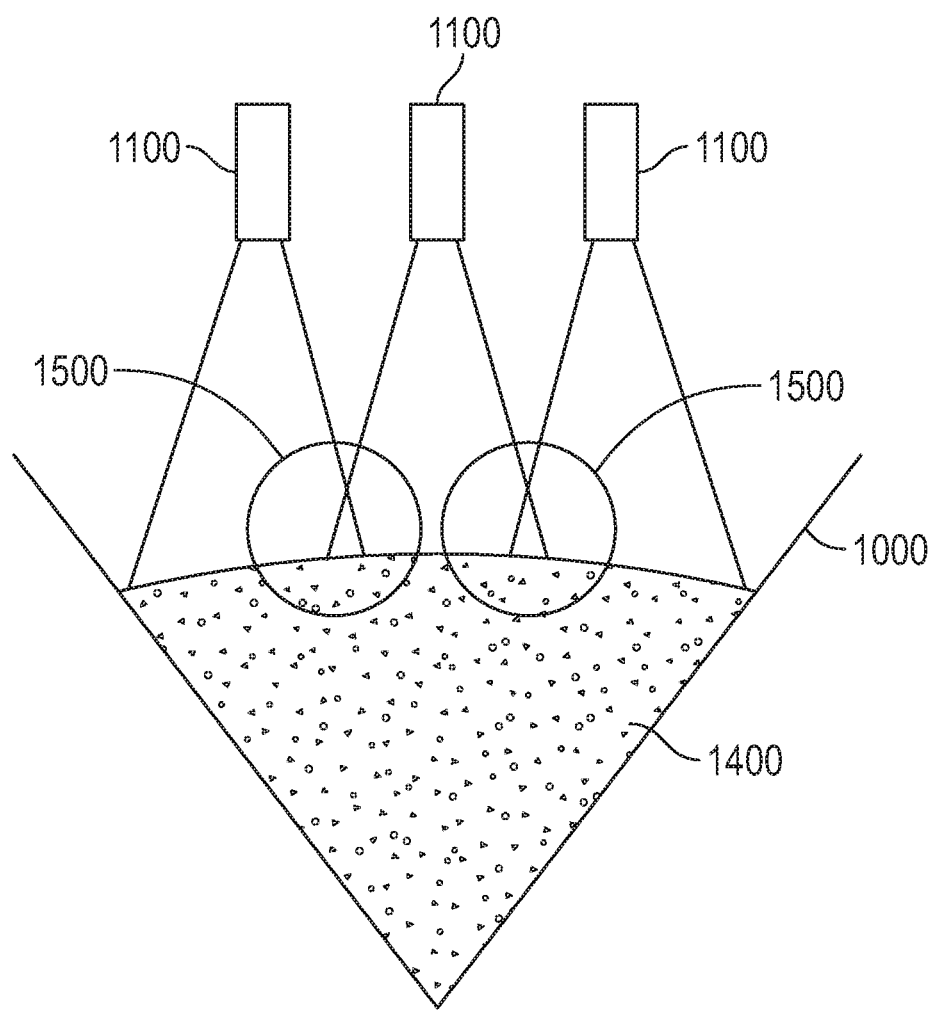
FIG. 3 is a schematic view of a prior art process of coating particles.

In contrast, conventional coating processes yield uneven treatment levels (i.e., amount of coating) such that some particles are coated while others are not, or some particles have significantly greater (or lesser) amounts of coating than other particles. This results in conventional coated particles having a coating amount (or treatment level) that may be significantly different than is reported by the manufacturer. In particular, as shown in FIG. 3, the conventional process for coating particles includes placing the dry, uncoated particles on V-shaped conveyor belt 1000 and passed under one or more nozzles 1100 that spray the coating 1200 onto the mounded particles 1400 on the V-shaped conveyor belt 1000. As can be seen in the schematic of FIG. 3, this process deposits the highest concentration of coating on the particles at the top of the mound 1400, and the lowest concentration of coating on the particles at the bottom of the mound 1400. Indeed, because the conveyor belt is V-shaped, the particles at the bottom of the mound 1400 are blocked from the nozzles 1100 by the particles at the top of the mound 1400. As such, the particles at the bottom of the mound 1400 receive significantly less coating than the particles at the top of the mound. Additionally, in an effort to coat at least the entire top surface of the mound 1400, the nozzles 1100 are spaced apart from each other such that the spray from the nozzles overlap (at points 1500) at the surface of the mound 1400. These overlapping areas 1500 result in higher coating concentrations on the particles in the overlapping regions 1500 at the top of the mound. This results in the particulate material having inconsistent treatment levels (or coating amounts) on the different particles of the particulate material.

These inconsistencies lead to particles having widely differing coating amounts (or treatment levels), which yields coating levels having very large standard deviations (and relative errors). For example, these conventional coating processes yield relative errors (calculated by dividing standard deviation by the average coating level) in the coating level (or amount) of greater than 20%. For example, in a sample with an average coating level of 0.57%, the standard deviation can be 0.12%, and the relative error can be 20-21%. As another example, in a sample with an average coating level (or amount) of 0.92%, the standard deviation can be 0.24%, and the relative error can be 26%.

These conventional processes also yield products with higher dust levels and poorer staining performance. For example, while coated particles according to embodiments of the present disclosure can have a dust index of 0.7 to 1.8 (as discussed above), particles coated by these conventional processes have dust indices greater than 3, for example 3.4 to 3.8. Also, while coated particles according to embodiments of the present disclosure register an average staining loss of about 8% to about 11%, particles coated by these conventional processes register an average staining loss of 12.9% or greater.

EXAMPLES AND COMPARATIVE EXAMPLES

The following example and comparative examples are provided for illustrative purposes only, and do not limit the scope of embodiments of the present disclosure.

Example 1

A calcined kaolin clay was used as the substrate material, and 1:1 mixture of SILRES® B1 3003 and water as the coating material. The calcined kaolin clay was fed into a paddle mixer, and the flow rate of the clay was metered by changing the size of the orifice into the mixer. The coating material was fed into the paddle mixer, and the flow of the coating material was metered using a positive displacement pump. The amount of clay and coating material was pre-measured to achieve a 1% coating level on the clay. The clay and coating material were mixed in the paddle mixer, and then delivered into a fluidized bed dryer fitted with two hot air conduits connected to a flame preheater. The fluidized bed dryer was also fitted with three exhaust conduits for venting the exhaust stream from the fluidized bed dryer. The three exhaust conduits were connected to a common exhaust hose that delivered the exhaust stream from the fluidized bed dryer to a cyclone fines collector. The cyclone fines collector was connected to a baghouse dust collector via a second exhaust hose which delivers the exhaust stream from the cyclone fines collector to the baghouse dust collector.

The paddle mixer mixed the coating material and the clay to form a wet mixture, which was then delivered to the conveyor belt of the fluidized bed dryer. The hot air conduits delivered air preheated to a temperature of 325° F. (163° C.) to the fluidized bed dryer. The wet mixture was dried and cured as it moved along the length of the fluidized bed dryer. The dried and cured product was then dropped into a bin at the end of the fluidized bed dryer. The resulting dried and cured product was subject to testing for coating level (and uniformity), staining performance, and dust level (i.e., dust index).

Comparative Example 1

Coated granules from National Coatings Corporation (Camarillo, Calif.) with a reported coating level of 0.9 wt % were subjected to the same testing as Example 1 to determine coating level (and uniformity), staining performance, and dust level. The reported coating level of 0.9 wt % in this Comparative Example refers to the amount of wet coating material added to the dry particles and does not reflect an actual measurement of the coating level after application and curing of the coating material.

Comparative Example 2

Coated granules from Amberger Kaolinwerke Eduard Kick GmbH & Co. ("AKW") (an affiliate company of Quarzwerke GmbH) (Hirschau, Germany) with a reported coating level of 0.9 wt % were subjected to same testing as Example 1 to determine the average coating level (and uniformity). The reported coating level of 0.9 wt % in this Comparative Example refers to the amount of wet coating material added to the dry particles and does not reflect an actual measurement of the coating level after application and curing of the coating material.

Coating (and Uniformity) Testing

The amount of coating deposited on the substrate material is related to the loss-on-ignition. With this particular resin (i.e., the SILRES® B1 3003 resin), the actual coating level of coated granule can be generally represented by 2.8×loss-on-ignition at 600° C. (or 2.5×loss-on-ignition at 1000° C.). Loss-on-ignition (at 600° C. or 1000°) is a measure of the weight lost after the coated granules are heated at high temperatures (i.e., 600° C. or 1000° C.). At those high temperatures, certain organic materials will burn off of the coating, thereby lessening the actual amount of coating on the particles. The loss-on-ignition values were measured using a SensorTech NIR-6000 instrument, manufactured by SensorTech Systems, Inc. (Oxnard, Calif.).

To determine the actual amount of coating on the particles, the loss-on-ignition at 600° C. was measured for Example 1, and Comparative Examples 1 and 2. The actual coating level was then calculated using the appropriate correction factor (i.e., actual coating=2.8×loss-on-ignition at 600° C.). The correction factor was determined by creating coatings of known level, by weight, and then burning off the coating to determine the LOI. The ratio of known coating level to LOI is the correction factor. Also, to determine uniformity of the coating, various samples from different locations in the coated product were collected and tested for the loss-on-ignition value. In particular, 22 different samples were taken from various positions in the Example 1 product, 130 different samples were taken from the Comparative Example 1 product, and 27 samples were taken from the Comparative Example 2 product. These multiple loss-on-ignition values were converted to coating level values using the appropriate conversion factor, and these conversions were then used to calculate an average coating level, a standard deviation from the average coating level, and a relative error. These results are reported in Table 1, below.

TABLE 1

Coating Level Uniformity/Variation

|  | Example 1 | Comp. Ex. 1 | Comp. Ex. 2 |
| --- | --- | --- | --- |
| Average Coating Level | 0.98 | 0.57 | 0.92 |
| Minimum Coating Level | 0.8 | 0.13 | 0.66 |
| Maximum Coating Level | 1.1 | 0.88 | 1.53 |
| Standard Deviation | 0.8 | 0.12 | 0.24 |
| Relative Error | 8.0% | 20.1% | 26.0% |
| No. of Samples | 22 | 130 | 27 |

As can be seen from Table 1, while the Example 1 particulate material achieved a uniform coating level of 0.98% with a relative error of only 8.0%, both the Comparative Example 1 and Comparative Example 2 products had coating levels that varied widely among the samples. Indeed, both the Comparative Example 1 and Comparative Example 2 products registered a relative error of greater than 20%, which is more than double the relative error achieved by the Example 1 product and process. As such, this testing shows that the product and process according to embodiments of the present disclosure achieve a more uniform coating level on the substrate particles that conventional processes have not been able to obtain. Additionally, while the Comparative Example 1 coated particles are reported to have a coating level of 0.9 wt %, as shown in Table 1, those particles have an actual coating level much lower than reported (i.e., 0.57). This is because the reported coating level refers to the amount of wet coating material added to the dry particles and does not reflect an actual measurement of the coating level after application and curing of the coating material.

Staining Performance Testing

The staining loss of the particulate materials of Example 1 and Comparative Examples 1 were determined by coating an asphalt sample with the respective particulate material, and subjecting the coated sample to a 14 day dark aging test in which the coated sample is placed in an 80° C. dark oven for 14 days. Staining measurements (i.e., solar reflectance measurements) were taken at the time the samples were made and after 4, 7 and 14 days aging. The staining loss was taken as the difference in value between the measurement taken at 14 days aging and the measurement taken when the samples were made. To determine uniformity of performance, and calculate a standard deviation and relative error, several samples of Example 1 and Comparative Example 1 were prepared and tested. Specifically, in a first run, 10 samples were prepared using Example 1 as the coating material, and 127 samples were prepared using Comparative Example 1 as the coating material. And in a second run, 22 samples were prepared using Example 1 as the coating material, and 130 samples were prepared using Comparative Example 1 as the coating material. The results are shown in Table 2 below.

TABLE 2

|  | Example 1 (run 1) | Example 1 (run 2) | Comp. Ex. 1 (run 1) | Comp. Ex. 1 (run 2) |
| --- | --- | --- | --- | --- |
| Average % Staining Loss | 9.1 | 6.43 | 12.9 | 20.1 |
| Minimum % Staining Loss | 5.4 | 1.9 | 1.4 | 12.2 |
| Maximum % Staining Loss | 15.0 | 16.1 | 24.1 | 31.2 |
| Standard Deviation | 3.0 | 3.9 | 5.2 | 6.0 |
| Relative Error | 33.1% | 61.2% | 40.7% | 29.7% |
| No. of Samples | 10 | 22 | 127 | 130 |

As shown in Table 2, while the Example 1 particulate material achieved an average staining loss of 9.1% or 6.43%, the Comparative Example 1 products exhibited significantly higher average staining losses, i.e., 12.9% or 20.1%. These results show that the product and process according to embodiments of the present disclosure achieve improved staining performance compared to conventional products and processes.

Dust Level (Dust Index) Testing

In addition, Example 1 and Comparative Example 1 were tested to determine the level (or amount) of dust. The amount of dust is represented by a dust index, which is measured by the DustMon dust measurement device (available from Microtrac Inc., Montgomeryville, Pa.). As discussed above, the dust index is a measure of airborne dust in a sample of particles, and this parameter is determined by dropping the sample of particles into a sample container from the top of a fixed length of pipe. When the sample lands in the sample collector at the bottom of the length of pipe, air currents and the force of the impact causes the dust in the sample to travel back upwards to a measurement area which contains a light source and a detector. The detector detects changes in light intensity from the light source. In particular, the dust from the sample obstructs some of the light from the light source, and the detector detects the decrease in light intensity, and outputs a dust index based on the decrease in light intensity. The dust index is the sum of the maximum dust concentration plus the dust concentration after 30 seconds. The dust concentration is reported in percentage (%) light obstruction, where 100% refers to complete blockage of light from the light source at the detector (for example, by placing a hand or other fully obstructive object in front of the light source). Any of the DustMon line of instruments (manufactured by Microtrac Inc., Montgomeryville, Pa.) can be used for this test. However, in the tests performed here, the DustMon L was used.

To determine a standard deviation and a relative error, several samples (from different areas of the bulk material or taken from the fluidized bed dryer output of the Example 1 run at different times) of the Example 1 and Comparative Example 1 materials were tested. In particular, 6 samples of the Example 1 product, and 27 samples of the Comparative Example 1 product were tested. The results are listed below in Table 3.

Also, in measuring the dust index of the Comparative Example 1 product, one of the samples registered a dust index exponentially higher than the remaining samples. For the sake of improved comparison, Table 3 below also lists the Comparative 1 dust index results with this value omitted.

TABLE 3

|  | Ex. 1 | Comp. Ex. 1 | Comp. Ex. 1 (w/o 12.6) |
|---|---|---|---|
| Average Dust Index | 1.2 | 3.8 | 3.4 |
| Minimum Dust Index | 0.8 | 1.2 | 1.2 |
| Maximum Dust Index | 1.6 | 12.6 | 6.3 |
| Standard Deviation | 0.3 | 2.3 | 1.5 |
| Relative Error | 26.2% | 61.4% | 44.6% |
| No. of Samples | 6 | 27 | 26 |

As shown in Table 3, the Example 1 coated particulate material registers a significantly improved dust index. Specifically, while Example 1 registered an average dust index of 1.2, Comparative Example 1 registered a significantly higher average dust index of 3.8. Even when considering the Comparative Example 1 data excluding the sample that registered a dust index of 12.6, Comparative Example 1 registered an average dust index of 3.4. Comparing the data in Table 3, Comparative Example 1 registers a dust index that is more than 2.8 to 3.1 times greater than the 1.2 average dust index of Example 1.

The dust index of Example 1 also has a relative error of 26.2%, which is more than 35% lower than the 61.4% relative error of the dust index of Comparative Example 1. Even when considering the Comparative Example 1 data excluding the sample that registered a dust index of 12.6, the dust index of Comparative Example 1 had a relative error of 44.6%, nearly 20% higher than the relative error of the dust index of Example 1. These results show that the product and process according to embodiments of the present disclosure achieve significantly reduced dust levels compared to conventional products and processes.

While not bound by any particular theory, it is believed that the low dust levels achieved by the Example 1 products are (at least partially) due to the effective and consistent coating of the fine particles in the bulk material. As is generally understood by those of ordinary skill in the relevant field, finer particles (i.e., particles with smaller average particle sizes) have greater surface area than coarser particles (i.e., particles with larger average particle sizes). As an example of this, and to prove this point, 11 samples were taken from the bulk material of an uncoated clay substrate. Each of these samples was sieved using a 20-mesh sieve. The portions of each sample that were retained on the sieve (i.e., the +20-mesh samples) were taken as the coarse particles, and the portions of each sample that passed through the sieve (i.e., the −20-mesh samples) were taken as the fine particles. The surface area of 11 samples from the bulk material, as well as each of the +20 and −20 mesh samples were measured, and the results (including standard deviation and relative error) are reported in Table 4 below.

TABLE 4

|  | Bulk Material (Full Particle Size Distribution) | +20 Mesh Samples | −20 Mesh Samples |
|---|---|---|---|
| Average Surface Area ($m^{-1}$) | 6.64 | 4.55 | 9.41 |
| Minimum Surface Area ($m^{-1}$) | 5.44 | 4.16 | 9.05 |
| Maximum Surface Area ($m^{-1}$) | 7.57 | 5.09 | 9.94 |
| Standard Deviation | 0.65 | 0.27 | 0.27 |
| Relative Error | 9.8% | 6.0% | 2.9% |
| No. of Samples | 11 | 11 | 11 |

As shown in Table 4, the coarse (i.e., +20 Mesh) and fine (i.e., −20 Mesh) uncoated substrate particles have widely different surface areas. Specifically, the finer particles have more than double the surface area of the coarser particles. Given this relationship, to effectively and uniformly coat the bulk material, the amount of coating on the fine particles should be higher on the fine particles than on the coarse particles. More specifically, as the fine particles contribute more surface area to the bulk material, those particles should take on more of the coating than the smaller surface area coarse particles.

To prove that the fine particles are coated, and that they are coated at a level consistent with the average coating level achieved by the bulk material as whole, several samples of the Example 1 product were sieved using a 20-mesh sieve. The coating level of the portion of each sample retained on the sieve (denoted +20-mesh) as well as the portion that passed through the sieve (denoted −20-mesh) were measured using the SensorTech instrument discussed above in connection with the coating level and uniformity testing. In particular, the SensorTech NIR-6000 instrument was used to determine the loss-on-ignition at 600° C. of each of the +20 and −20 mesh samples, and the loss-on-ignition was converted to coating level values using the 2.8 correction factor discussed above. To establish a standard deviation and relative error, seven samples were taken from the bulk material and sieved as discussed here. The results are shown in Table 5 below.

Additionally, for the sake of comparison, seven samples were also taken from the Comparative Example 1 bulk material, and sieved using a 20-mesh sieve as discussed above to generate +20 and −20 mesh samples of the Comparative Example 1 product. The loss-on-ignition values at 600° C. of these +20 and −20 mesh Comparative Example 1 samples were also measured using the SensorTech instrument, and were then converted to coating level values using the 2.8 correction factor. These results are also shown in Table 5 below.

TABLE 5

|  | Ex. 1 (+20 Mesh) | Ex. 1 (−20 Mesh) | Comp. Ex. 1 (+20 Mesh) | Comp. Ex. 1 (−20 Mesh) |
|---|---|---|---|---|
| Average Coating Level | 0.84 | 1.20 | 0.64 | 0.65 |
| Minimum Coating Level | 0.60 | 0.91 | 0.56 | 0.53 |
| Maximum Coating Level | 1.08 | 1.44 | 0.81 | 0.84 |
| Standard Deviation | 0.16 | 0.16 | 0.09 | 0.10 |
| Relative Error | 18.6% | 13.2% | 13.5% | 15.4% |
| No. of Samples | 7 | 7 | 7 | 7 |

As shown in Table 5, while the Comparative Example 1 particles are reported to have a 0.9 wt % coating level, those particles have a much lower actual coating level. Specifically, the Comparative Example 1 particles had an average coating level of only 0.64-0.65, which is nearly 30% less coating than reported. Additionally, the Comparative Example 1 particles exhibited similar coating levels on the fine particles (i.e., the −20 Mesh samples) and the coarse particles (i.e., the +20 mesh samples). As the fine particles have significantly greater surface area than the coarse particles (as discussed above), an effective or uniform coating should have a higher coating level on the fine particles. That the Comparative Example 1 samples do not have higher coating levels on the fine particles shows that these materials are not uniformly or effectively coated.

In contrast, the Example 1 particles show a significant increase in coating level on the fine particles. Here, the fine particles had a 30% higher coating level on the fine particles than on the coarse particles. Since the fine particles have higher surface area than the coarse particles, this data indicates that the products and processes according to embodiments of the present disclosure effectively and uniformly coat the fine particles. This effective and uniform coating of the fine particles is at least partially responsible for the reduction in the dust levels (or dust index) exhibited in the Example 1 products.

Although various embodiments of the disclosure have been described, additional modifications and variations will be apparent to those skilled in the art. For example, the compositions and particulates may have additional components, which may be present in various suitable amounts, for example, other additives suitable to improve strength, reduce odor, and/or otherwise modify the properties of the composition and particulates manufactured. Similarly, the methods of preparing the compositions and particulates as described herein by way of example embodiments may be modified in accordance with the knowledge in the field to which the various embodiments pertain. For example, the methods of preparing the compositions and particulates may include additional steps, may be performed at various temperatures, and/or may be otherwise suitably modified (e.g., as described with reference to the compositions and particulates). As such, the disclosure is not limited to the embodiments specifically disclosed, and the composition, the particulates, and the methods of preparing the compositions and particulates may be modified without departing from the disclosure, which is limited only by the appended claims and equivalents thereof.

Throughout the text and claims, any use of the word "about" reflects the penumbra of variation associated with measurement, significant figures, and interchangeability, all as understood by a person having ordinary skill in the art to which this disclosure pertains. Further, as used herein, the term "substantially" is used as a term of approximation and not as a term of degree, and is intended to account for normal variations and deviations in the measurement or assessment associated with the composition, the particulates, and the method of preparing the compositions and particulates (e.g., in the description of physical or chemical properties of various components or compositions and in the description of amounts of various components).

What is claimed is:

1. A reflective particulate material, comprising:
a particulate substrate comprising particles; and
a coating on the particles of the particulate substrate, the reflective particulate material having:
a relative error of an amount of the coating on the particles particulate substrate of from about 5% to about 15%; and a standard deviation of the amount of coating on the particles particulate substrate of from about 0.05% to about 0.10%; and
a dust index of less than 2; and
a staining loss when applied to an asphalt substrate of less than 10%.

2. The reflective particulate material according to claim 1, wherein the coating comprises a fluoropolymer, fluorosilane, silane, siloxane, polysiloxane, organo-polysiloxane, silicate, organic silicate, silicone resin, acrylic, urethane, polyurethane, and/or glycol ether.

3. The reflective particulate material according to claim 1, wherein the coating comprises a silane and siloxane mixture.

4. The reflective particulate material according to claim 1, wherein the coating is present in an amount of about 3 wt % or less based on a total weight of the reflective particulate material.

5. The reflective particulate material according to claim 1, wherein the relative error of the amount of the coating on the particle is from about 5% to about 7%.

6. The reflective particulate material according to claim 1, wherein the particulate substrate comprises a clay.

7. A method of manufacturing the reflective particulate material of claim 1, the method comprising:
mixing the particulate substrate with a liquid coating composition to form a wet particulate mixture, the coating composition comprising a coating material;
passing the wet particulate mixture through at least one heat zone to remove water and to at least partially cure the coating material in the coating composition.

8. The method according to claim 7, wherein the mixing the particulate substrate with a liquid coating composition comprises:
metering an amount of the particulate substrate into a mixer;
metering an amount of the liquid coating composition into the mixer; and
mixing the particulate substrate and the liquid coating composition in the mixer.

9. The method according to claim 8, wherein the mixer comprises a paddle mixer comprising an elongated chamber housing a rotating barrel having a plurality of paddles extending radially from the barrel.

10. The method according to claim 7, wherein the passing the wet particulate mixture through at least one heat zone comprises passing the wet particulate mixture through at least first and second heat zones, the first heat zone being maintained at a lower temperature than the second heat zone.

11. The method according to claim 7, wherein the passing the wet particulate mixture through the at least one heat zone comprises delivering the wet particulate mixture to a fluidized bed dryer, the fluidized bed dryer comprising an elongated chamber into which air is introduced to convey the wet particulate mixture along a length of the elongated chamber past the at least one heat zone.

12. The method according to claim 11, wherein the at least one heat zone comprises at least first and second heat zones, the first heat zone being maintained at a lower temperature than the second heat zone, and the air first conveying the wet particulate mixture past the first heat zone and then past the second heat zone.

13. The method according to claim 11, wherein the fluidized bed dryer is coupled to a heater via at least one conduit, the at least one conduit delivering heated air from the heater to the at least one heat zone of the fluidized bed dryer.

14. The method according to claim 13, wherein the at least one conduit comprises at least first and second conduits and the at least one heat zone comprises at least first and second heat zones, the first conduit delivering first heated air to the first heat zone to maintain the first heat zone at a first temperature, and the second conduit delivering second heated air to the second heat zone to maintain the second heat zone at a second temperature, the first temperature being lower than the second temperature.

15. The method according to claim 7, wherein the passing the wet particulate mixture through the at least one heat zone generates an exhaust stream, the method further comprising filtering the exhaust stream.

16. The method according to claim 15, wherein the filtering the exhaust stream comprises delivering the exhaust stream to at least one dust collection device.

17. The method according to claim 16, wherein the at least one dust collection device comprises at least first and second dust collection devices.

18. The method according to claim 17, wherein the first dust collection device comprises a cyclone collector, and the second dust collection device comprises a baghouse dust collector.

* * * * *

UNITED STATES PATENT AND TRADEMARK OFFICE
CERTIFICATE OF CORRECTION

| | | |
|---|---|---|
| PATENT NO. | : 11,479,675 B2 | Page 1 of 1 |
| APPLICATION NO. | : 16/370303 | |
| DATED | : October 25, 2022 | |
| INVENTOR(S) | : Rhonda Marie Jenree et al. | |

It is certified that error appears in the above-identified patent and that said Letters Patent is hereby corrected as shown below:

In the Claims

Column 26, Line 2, Claim 1, after "particles" delete "particulate substrate"

Column 26, Line 3, Claim 1, before "a" delete "and"

Column 26, Line 4, Claim 1, after "particles" delete "particulate substrate"

Column 26, Line 23, Claim 5, delete "particle" and insert -- particles --

Signed and Sealed this
Seventeenth Day of January, 2023

Katherine Kelly Vidal

Katherine Kelly Vidal
*Director of the United States Patent and Trademark Office*